United States Patent [19]
Galbreath et al.

[11] 3,749,539
[45] July 31, 1973

[54] UNDERWATER PELLETIZER DIE PLATE

[75] Inventors: Paul J. Galbreath, Kingsport; Albert E. Spaller, Johnson City; Bruce W. Stockbridge, Kingsport, all of Tenn.

[73] Assignee: Eastman Kodak Company, Rochester, N.Y.

[22] Filed: Apr. 26, 1972

[21] Appl. No.: 247,542

[52] U.S. Cl. .............................. 425/313, 425/464
[51] Int. Cl. ............................................. B29f 3/08
[58] Field of Search .................. 425/307, 310, 311, 425/312, 313, 378, 379, 382, 404, 461, 464, 8, 67, 86, 191, 192, 197, 198

[56] References Cited
UNITED STATES PATENTS

| | | | |
|---|---|---|---|
| 3,599,285 | 8/1971 | Hamilton | 325/311 |
| 3,676,029 | 7/1972 | Hopkin | 425/311 X |
| 3,553,776 | 1/1971 | Romagano | 425/382 X |
| 3,493,996 | 2/1970 | Rohn | 425/313 |
| 3,461,495 | 8/1969 | Swickard | 425/382 X |
| 3,436,449 | 4/1969 | Treu | 425/311 X |
| 3,323,170 | 6/1967 | Swickard | 425/310 |
| 3,308,507 | 3/1967 | Black | 425/311 |
| 3,271,822 | 9/1966 | Rhino | 425/461 |
| 3,114,169 | 12/1963 | Palmer | 425/464 |
| 2,096,529 | 10/1937 | Sizer | 425/313 |

Primary Examiner—J. Spencer Overholser
Assistant Examiner—John S. Brown
Attorney—Cecil D. Quillen, Jr. and Malcolm G. Dunn

[57] ABSTRACT

Improved die plate for underwater extrusion pelletizer apparatus and method for making, wherein the die plate, essentially integral, defines on its extrusion face a first recessed surface extending around the die plate, a serpentine recessed channel within and deeper than the first recessed surface and extending nearly around the die plate, and a shoulder surrounding the serpentine recessed channel adjacent the first recessed surface. A thin inlay member seats over the serpentine channel and against the shoulder in sealing relation to provide with the serpentine channel a sealed chamber adapted to conduct a heated fluid nearly around the die plate. The first recessed surface is filled to the surface level of the inlay member and the face of the die plate with a wear resistant coating material of harder material than the material of the inlay member and the die plate. The wear resistant coating does not cover the inlay member but rather extends to either side of the inlay member and is adapted to support the pellet shearing knives from causing undue wear to the softer material of the inlay member and die plate. A plurality of insert members each defining an extrusion orifice therethrough are inserted through openings centrally formed at spaced intervals through the serpentine-configurated inlay member and through the opposite face of the die plate and are sealingly secured at their junctures with the opposed faces of the die plate. Inlet and outlet passages extend into the die plate in communication with the sealed chamber and serve to introduce into and remove from the sealed chamber a fluid heating medium for circulation along the serpentine channel entirely around each of the insert members.

2 Claims, 4 Drawing Figures

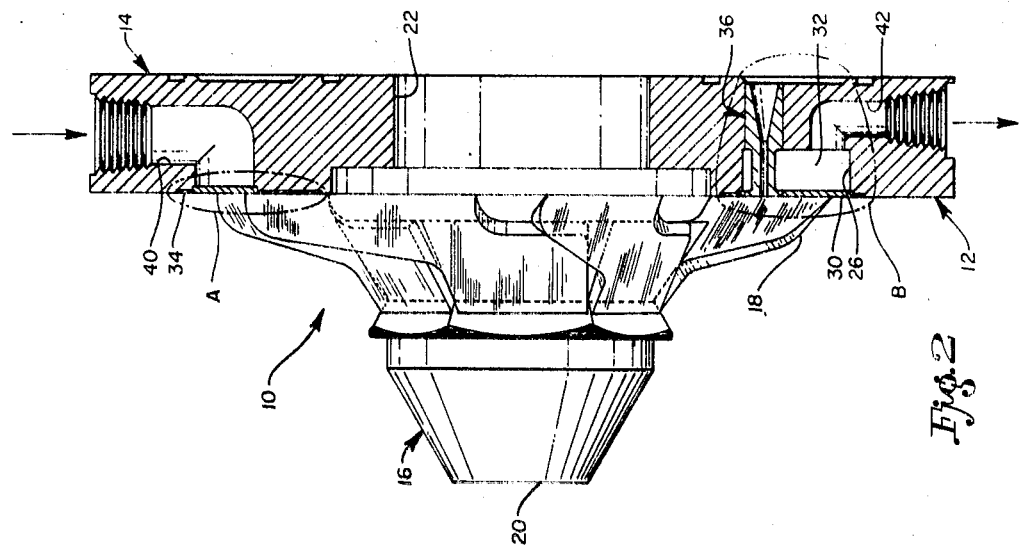
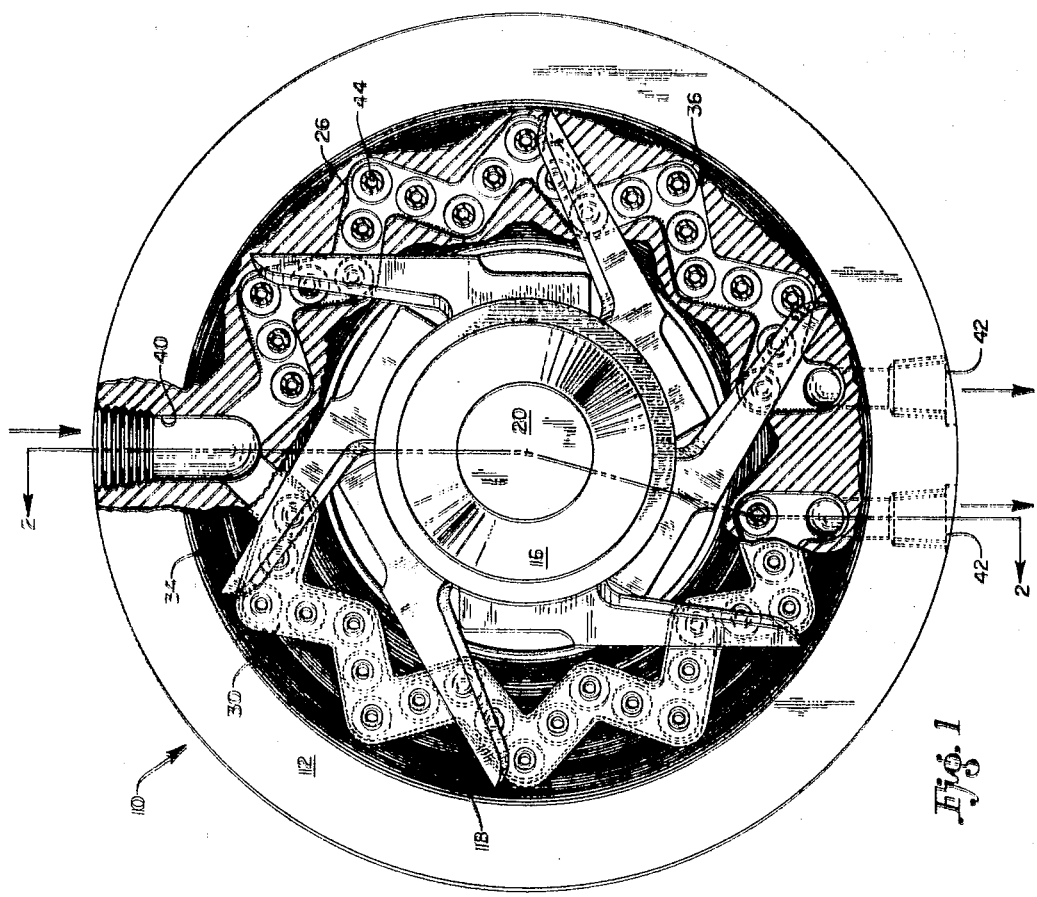

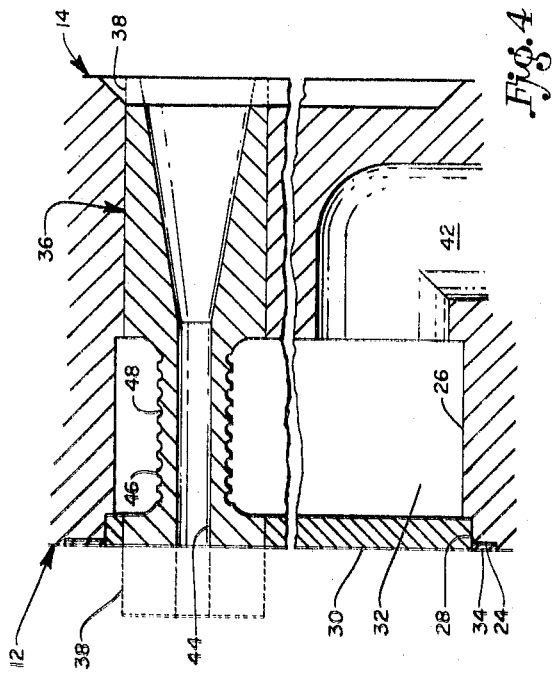
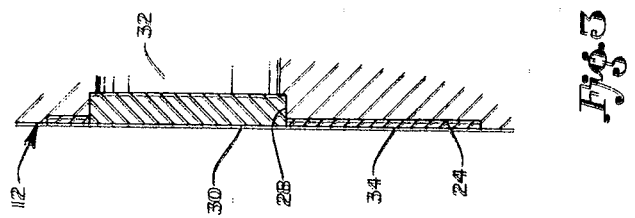

UNDERWATER PELLETIZER DIE PLATE

BACKGROUND OF THE INVENTION

This invention is directed to apparatus for extruding thermoplastic materials and particularly concerns an improved underwater pelletizer die plate for use with such extrusion apparatus.

When making use of thermoplastic materials, such as for injection molding, compression molding, melt spinning or in other instances, the thermoplastic materials are more readily handled if provided in the form of free-flowing granules or pellets of substantially uniform size. The methods of the art include using devices which extrude the thermoplastic material in the form of continuous rods which are severed soon after extrusion and after being cooled in a water bath or while under water at the face of the die plate. In the instance of the latter device hot thermoplastic material is extruded through extrusion orifices in a die plate in the form of hot thermoplastic rods from a flat face portion of a die plate into a water-filled compartment or chamber, and while immersed in the water the rods are cut into short lengths or pellets by knives mounted on a hub-like member and driven in rotation by a shaft. The cutting edges of the knives lie flat or substantially so against the flat face of the die plate and wipe across the face of the orifices in a cutting or shearing action as the hub is rotated by the shaft. The Hull et al. U.S. Pat. No. 2,918,701, and the Street U.S. Pat. No. 3,271,821, disclose operations of this nature.

Various ways have been proposed in the art to minimize wear of the die plate from the rotating knives. One way that is disclosed in the Swickard, Jr. et al. U.S. Pat. No. 3,287,764, concerns the use of hardened or carbide nozzle tips that define the cutting surface on the face of the die plate. The nozzle tips are extensions of the orifices through which the hot thermoplastic material is extruded. A disadvantage of this arrangement, however, is that as the knives wipe across the arrayed concentric rows of hardened nozzle tips, the edges of the knives eventually become worn in the area of the path defined by the nozzle tips while the portions of the knife edges beyond and between the nozzle tips wear away the face of the die plate with the result that the knives may catch on one or more such nozzle tips and pull them from the die plate.

Another way employed in the art to minimize wear to the extrusion face of the die plate is that disclosed in the McNeal, Jr. U.S. Pat. No. 3,452,394, wherein a multiplicity of small, square tungsten carbide tiles are secured in rows and in a side-by-side arrangement. A disadvantage of this arrangement is the cost of fabrication and difficulty of getting each tile suitably welded or brazed into position in addition to forming a suitable size hole in each for the outlet of an extrusion orifice.

The art also discloses various ways to heat the die plate in an attempt to obtain uniform heat distribution to each extrusion orifice and prevent the orifices from becoming plugged. If the temperature at any nozzle for such orifice should drop below the desired critical temperature applicable to a particular thermoplastic material being extruded, the material may plug that orifice or orifices and cause the remaining nozzles to extrude at an accelerated rate, thereby affecting the uniformity of the pellets being sheared by the rotating knives. The working nozzles become somewhat hotter due to friction of the excess material moving through them and aggravates the process, a problem recognized in the Gove et al. U.S. Pat. No. 3,427,685. The Gove et al. patent thus discloses the use of one form of a serpentine-like heating passageway extending through an annular array of nozzles so as to apply substantially uniform heat to each nozzle of the array. The Swickard, Jr. et al. U.S. Pat. No. 3,287,764 mentioned above, also discloses another form of zig-zag or serpentine-like flow path for the heating liquid around the nozzle so that each orifice of a nozzle is uniformly heated and the liquid does not by-pass some of the nozzles. In either instance, however, the extrusion nozzles radially extend in rows with each row being formed within pie-shaped segments of metal with the flow paths for the heated fluid extending along the sides of the pie-shaped segments.

SUMMARY OF THE INVENTION

In overcoming the problems and enhancing the advantages in the prior art mentioned above, our improved die plate for an underwater pelletizer extrusion apparatus is formed in one integral member with the die plate on its extrusion side defining a first recessed surface within and extending around the one face of the die plate and a serpentine recessed channel within and deeper than the first recessed surface, with a shoulder surrounding the serpentine recessed channel adjacent the first recessed surface. A thin inlay member having the general configuration of the serpentine channel is adapted to seat over the serpentine channel and against the shoulder in sealing relation to provide with the serpentine channel a sealed chamber in the die plate that is adapted to conduct a heated fluid substantially around the die plate. The first recessed surface is filled to the surface level of the inlay member and the face of the die plate with a coating material adapted to resist wear and being of harder material than the material of the inlay member or of the die plate or possibly even of the knives that will be used against the face of the die plate when installed in the extrusion apparatus. A plurality of insert members each defining an extrusion orifice therethrough are inserted through openings of predetermined diameter formed at spaced intervals through the serpentine configurated inlay member and through the opposite face of the die plate so that the insert members extend through the die plate and beyond the face of the inlay member and the opposite face of the die plate and are centrally located in the channel. The insert members are sealingly secured as by welding at their junctures with the aforementioned faces. The portions of the insert members that extend beyond the opposite faces of the die plate are removed as by machining until the terminal end portions of the insert members are flush with such faces. Each insert member is adapted to convey through the extrusion orifice extruded material. Inlet and outlet passages that extend into the die plate and in communication with the serpentine sealed chamber are formed and serve to introduce into and remove from the otherwise sealed chamber a fluid heating medium for circulation entirely around each of the insert members which are centrally located in and spaced along the serpentine channel.

In this manner of construction the die plate may be formed of metal having the most desirable heat transferring characteristics even though the metal may be of a softer material that, except for the wear resistant coating material, would otherwise be readily worn away by the knives wiping across the face of the die plate.

The serpentine configuration used for the sealed chamber through which heated fluid, such as a heating oil, circulates around each insert member not only serves as the most effective form known for assuring uniform heat transfer to and entirely around each extrusion orifice but also in the particular configuration employed, and in cooperation with the wear resistant coating, enables the entire length of each knife edge to come into contact with the wear resistant coating. Since the wear resistant coating extends adjacent either side of the serpentine configurated inlay member, the knives are supported by the wear resistant coating and are prevented from wearing away the surface of the inlay member which is constructed of a softer material save that insignificant portion that may be worn away due in time to normal wear of the harder wear resistant coating. The knives are thus evenly worn along their length by continual engagement with the wear resistant coating with the coating serving, in effect, as would a sharpening stone, yet without running the risk of wearing only at certain portions of the length of a knife and as a consequence extending undesirably into the softer material portions of the die plate and the inlay member. In this manner also, the inlay member may be made relatively thin without shortening the usable working life of the die plate, and thereby assure maintenance of uniform heat transfer along that portion of the extrusion orifice that extends through the inlay member.

Another advantage of this construction enables the wear resistant coating, which is otherwise brittle, to be supported by that structure of the die plate that is less subject to deflection and large thermal stresses. Any cracks that might occur in the coating would be of little consequence since it would continue to function as a wear surface and would not result in leakage of the hot oil which could otherwise occur if the wear resistant coating constituted material of the inlay member, and if it were to cover the surface of the inlay member, any cracks occurring in it would initiate cracks in the inlay member beneath.

BRIEF DESCRIPTION OF THE DRAWINGS

In the drawings:

FIG. 1 is a plan view of the extrusion side or face of the die plate with a portion of the face removed to show the inserts centrally positioned along the serpentine channel, and to illustrate the position of the knives relative to the wear resistant surface either side of the serpentine channel, and further illustrates the inlet passage opening into the channel and the outlet passages;

FIG. 2 is an elevational view in cross-section of the die plate taken along line 2—2 of FIG. 1 and illustrates the positions of the annular recess, serpentine channel recess, inlay member, wear resistant coating material and the hub which supports the knives;

FIG. 3 is an enlarged view of a portion of the extrusion face taken at portion A in FIG. 2; and FIG. 4 is an enlarged view of the insert member taken at portion B in FIG. 2.

DESCRIPTION OF THE PREFERRED EMBODIMENT

In reference to the drawings, the improved underwater pelletizer die plate is shown generally at 10. The die plate is adapted to be used with an underwater pelletizer extrusion apparatus (not shown) wherein the extrusion face 12 of the die plate is usually under water within a chamber (not shown), such as the chamber disclosed in the aforementioned Swickard, Jr. et al. U.S. Pat. No. 3,287,764. The opposite face 14 (FIGS. 2, 4) of the die plate is adapted to be exposed to hot melted thermoplastic material (not shown) which is to be extruded through the die plate. A hub assembly 16 is rotatably supported adjacent the extrusion face 12 of the die plate and is adapted to support one or more knives 18 in a manner that will enable the knives to sweep around the extrusion face in a cutting or shearing action. The hub assembly is supported for driving rotation by a shaft (not shown), such as shown in the aforementioned Swickard, Jr. et al. patent, and each knife 18 is supported by the hub 20.

The die plate 10, preferably of a good heat transfer or conductive metal such as Nickel 200, is largely or primarily of one piece or integral to minimize the number of welds required and to withstand without leakage the large operating pressures that will be imposed upon it. The die plate is annular in configuration, with the inner opening 22 adapted to accommodate part of the shaft (not shown) for rotatably supporting the hub assembly 16. A first recessed surface 24 of a desired depth, generally annular in configuration, is formed in the extrusion face 12 and extends therearound. A serpentine or zig-zag-like channel 26 is formed recessed within the first recessed surface 24 to a desired depth and extends nearly around the die plate. The serpentine recessed channel may be formed by suitably programmed numerical controlled machining equipment.

A shoulder or rabbet 28 is then formed around the serpentine recessed channel 26 adjacent the first recessed surface 24, and an inlay member 30 having the general serpentine configuration is then seated over the serpentine channel and against the shoulder 28. The inlay member, also of the same metal as that of the die plate, Nickel 200, is suitably secured in position as by welding so that it forms with the serpentine recessed channel a sealed chamber 32. The surface of the inlay member is substantially on a level with the main surface of the extrusion face of the die plate. The annular recess or first recessed surface is next filled to the surface level of the inlay member and the main surface of the extrusion face with a highly wear resistant coating or coating material 34 such as Certanium 27B metal. The coating thus extends to either side of the serpentine-like inlay member 30 but does not cover the inlay member.

Openings of predetermined diameter are then centrally formed at spaced intervals through the serpentine configurated inlay member 30 into the chamber 32 and through the opposite face 14 of the die plate, and insert members 36 are inserted through the openings until the insert members extend beyond the face of the inlay member and the opposite face of the die plate, as shown in phantom lines 38 in FIG. 4. The insert members are secured at their junctures with the aforementioned faces, as by welding, and the portions which extend beyond the faces are subsequently removed as by a machining operation when the whole extrusion face of the die is uniformly machined into one smooth surface with the insert member terminal end portions being flush with the two faces.

During the course of fabrication an inlet passage 40 and outlet passages 42 are formed in the die plate so that they are in communication with the sealed serpentine chamber, and it is through these passages that a heated fluid, such as a suitable heating oil (not shown) is introduced into and removed from the chamber, as indicated by the direction arrows in FIGS. 1 and 2.

In reference to FIG. 4 where one of the insert members 36 is shown in more detail, the insert member is provided with an extrusion orifice 44 which in the area of the chamber 32 and inlay member is of uniform diameter. The necked-in portion 46 of the insert member that defines the orifice in the area of the chamber may be provided with annular grooves 48, the necked-in portion and annular grooves cooperating to enable good heat transfer from the heating fluid to the thermoplastic material as it is being extruded through the extrusion orifice. In this manner the thermoplastic material is maintained in its desired melted condition up to the extrusion face of the die plate. The insert members are also preferably made from Nickel 200 metal.

When the knives are rotated around the surface of the extrusion face, they sweep not only along the serpentine-configurated inlay member through which thermoplastic material is extruded from the extrusion orifices, but also sweep across the wear resistant coating or coating material 34 in such manner that substantially all of the length of the cutting edges eventually come into contact with the wear resistant coating material. Since the wear resistant coating is of harder material than the Nickel 200 of the die plate and the inlay member, the coating material acts somewhat like a sharpening stone, as previously mentioned, having a tendency in time to wear each knife edge in substantially uniform manner and to support the knives against causing undue wear to the softer metal of the inlay member. In time, of course, and as is true of sharpening stones, the wear resistant coating material will become gradually and slightly worn with the surface of the inlay member also being worn to a similar but insignificant extent. The working life of the die plate, however, is greatly extended by this manner of construction and prevents undue damage to the thinner inlay member. The use of the thinner inlay member makes it possible for the heated fluid to maintain the thermoplastic material in the desired melted condition right up to where it emerges in the form of a thermoplastic rod from the extrusion face prior to being cut or sheared by the rotating knives.

Obviously, materials other than Nickel 200 and Certanium 27B metal may be employed without departing from the scope of the invention. The harder Certanium 27B metal is more brittle, but in the particular manner employed it is supported by the die plate at a location not expected to deflect under operating pressure or be subject to large thermal stresses.

The flow of the heated fluid or oil may be split at the inlet passage 40, as shown, so as to follow along each half of the die plate a minimum path along the serpentine channel and around each of the insert members with minimum heat loss.

While the invention has been described in detail with particular reference to preferred embodiments thereof, it will be understood that variations and modifications can be effected within the spirit and scope of the invention as described hereinabove and as defined in the appended claims.

We claim:

1. An improved underwater pelletizer die plate defining a first recessed surface within and extending around one face of the die plate, a serpentine recessed channel within and deeper than said first recessed surface, a shoulder surrounding said serpentine recessed channel adjacent the first recessed surface, an inlay member adapted to seal over said serpentine channel and against said shoulder in sealing relation to provide with the serpentine channel a sealed chamber in said die plate adapted to conduct a heated fluid substantially around the die plate, a coating adapted to resist wear and to fill said first recessed surface to the surface level of the inlay member and the face of the die plate;

a plurality of insert members each defining an extrusion orifice therethrough and extending through the inlay member and into and through the die plate and terminating flush in sealing relation with the other face of the die plate and with the surface of the inlay member and centrally positioned in the serpentine channel and equally spaced from adjacent insert members along the serpentine chamber, each said insert member adapted to convey through said extrusion orifice extruded material; and means including inlet and outlet passages extending into the die plate and in communication with said serpentine sealed chamber by which a fluid heating medium may be introduced into said sealed chamber for circulation entirely around each of said insert members and be removed from said sealed chamber.

2. An improved underwater pelletizer die plate as defined in claim 1, and wherein each of said insert members defines an extrusion orifice that is of uniform internal diameter along that portion of the length of the insert member that is within the sealed serpentine chamber, and in the same portion also defines a reduced exterior diameter having a series of grooves formed within and extending around the surface of the insert member.

* * * * *